US009564054B2

(12) United States Patent
Schalk et al.

(10) Patent No.: US 9,564,054 B2
(45) Date of Patent: Feb. 7, 2017

(54) WILDLIFE WARNING SYSTEM

(71) Applicant: IPTE Schalk & Schalk OG, Graz (AT)

(72) Inventors: Andreas Schalk, Graz (AT); Rainer Schalk, Unterpramstetten (AT)

(73) Assignee: IPTE Schalk & Schalk OG, Graz (AT)

( * ) Notice: Subject to any disclaimer, the term of this patent is extended or adjusted under 35 U.S.C. 154(b) by 0 days.

(21) Appl. No.: 14/388,501

(22) PCT Filed: Mar. 28, 2013

(86) PCT No.: PCT/EP2013/056753
§ 371 (c)(1),
(2) Date: Sep. 26, 2014

(87) PCT Pub. No.: WO2013/144312
PCT Pub. Date: Oct. 3, 2013

(65) Prior Publication Data
US 2015/0070164 A1 Mar. 12, 2015

(30) Foreign Application Priority Data
Mar. 29, 2012 (EP) .................... 12162308

(51) Int. Cl.
G08G 1/16 (2006.01)
A01M 29/18 (2011.01)
A01M 29/00 (2011.01)

(52) U.S. Cl.
CPC .............. *G08G 1/164* (2013.01); *A01M 29/00* (2013.01); *A01M 29/18* (2013.01)

(58) Field of Classification Search
CPC ...... A01M 29/00; A01M 29/06; A01M 29/14; A01M 29/16; A01M 29/18; A01M 29/22; A01M 29/24; A01K 15/023; A01K 29/005; G08G 1/162; G08G 1/164
See application file for complete search history.

(56) References Cited

U.S. PATENT DOCUMENTS

| 6,629,389 B1 * | 10/2003 | Rust ...................... E01F 9/0117 248/551 |
| 6,690,265 B2 * | 2/2004 | Hagstrum .............. A01K 15/02 119/713 |
| 6,816,086 B1 | 11/2004 | Kieffer, Sr. ................... 340/933 |

(Continued)

FOREIGN PATENT DOCUMENTS

| DE | 41 40 662 | 4/1993 | ............ A01M 31/00 |
| DE | 10 2011 102 759 | 1/2012 | ............ B60W 30/08 |

OTHER PUBLICATIONS

International Search Report from corresponding International Patent Application No. PCT/EP2013/056753, (English-language translation provided), dated Jul. 1, 2013.

(Continued)

*Primary Examiner* — Van Trieu
(74) *Attorney, Agent, or Firm* — Kusner & Jaffe

(57) ABSTRACT

A wildlife warning system that comprises at least two independent warning devices, wherein each warning device has an electric power supply, at least one signal generator, a microcontroller for controlling the signal generator, and a communication means for wireless communication with other warning devices and/or with a base station for the purpose of forming a wireless network of wildlife warning devices.

14 Claims, 2 Drawing Sheets

(56) References Cited

U.S. PATENT DOCUMENTS

| | | | |
|---|---|---|---|
| 8,297,857 B2* | 10/2012 | Schippers | F16M 11/10 396/428 |
| 2002/0145519 A1 | 10/2002 | Hykawy | 340/567 |
| 2003/0071735 A1 | 4/2003 | Hanson et al. | 340/573.2 |
| 2007/0044732 A1* | 3/2007 | Araki | A01K 11/008 119/721 |
| 2007/0286071 A1* | 12/2007 | Cormode | H04L 43/16 370/229 |
| 2013/0257641 A1* | 10/2013 | Ronning | G01S 13/42 342/54 |
| 2014/0047242 A1* | 2/2014 | Ukil | H04W 12/04 713/171 |
| 2014/0253345 A1* | 9/2014 | Breed | G08G 1/096716 340/905 |
| 2014/0261151 A1* | 9/2014 | Ronning | A01M 29/10 116/22 A |
| 2015/0123819 A1* | 5/2015 | Chang | G01S 7/521 340/943 |

OTHER PUBLICATIONS

English translation of the International Preliminary Report on Patentability (including Written Opinion of the International Seaching Authority) for corresponding International Patent Application No. PCT/EP2013/056753.

* cited by examiner

WILDLIFE WARNING SYSTEM

FIELD OF THE INVENTION

The present invention relates to a wildlife warning system, particularly a wildlife warning system for preventing wildlife accidents through collisions between wild animals and vehicles of all kinds, particularly motor vehicles, but also rail vehicles or aircraft that are taking off and landing.

BACKGROUND OF THE INVENTION

Accidents with wild animals, particularly relatively large wild animals such as deer, stags or wild boar, are regretfully part of the daily road scene and not only usually end in the death of the wild animals in question but also cause high levels of annual personal and material damage. Ever quieter vehicles, which also have a tendency to move at a higher speed, mean that the trend toward serious wildlife accidents has rather increased in recent years, since the animals are not left with sufficient time to escape when a vehicle approaches. Wildlife accidents are not just a large problem for road traffic, however, but are also a large source of danger for rail traffic, particularly for high-speed passenger trains, and also for aircraft that are taking off and landing.

Particularly for road traffic, a wide variety of approaches to preventing wildlife accidents have been developed in past decades. Besides costly structural measures, such as creating wildlife bridges, wildlife tunnels or wildlife fences, a wide variety of wildlife warning devices are also known that are usually fitted at the edge of the road on exposed road sections and are intended to prevent collisions between wild animals and vehicles by transmitting audible and/or visual signals. A variant of such wildlife warning devices is based on the detection of the wild animals themselves. By way of example, wildlife warning devices are known that use light barriers that run along the roadsides, with interruption of the light barrier by a wild animal being followed by the transmission of audible and visual warning signals in order to prevent the wild animal from crossing the road. Other wildlife warning devices are based on the detection of approaching vehicles. Such apparatuses are known as passive and active variants. The passive variants merely involve the headlamp light from approaching vehicles being deflected to the side by suitable reflectors, as a result of which the visual effect is meant to prevent the wildlife from crossing the road and hence to avoid accidents. The effectiveness of such passive reflectors is found to be very restricted, however. Much more effective are active electronic wildlife warning devices that have a dedicated electric power supply and, by way of example, use a light sensor to detect an approaching vehicle and are subsequently able to actively emit audible and/or visual warning signals. A typical example of such a wildlife warning device that has an electric power supply, at least one signal generator for emitting audible and/or visual signals and a microcontroller for controlling the signal generator is the wildlife protection appliance from the applicant, which is sold under the name WWG2.1 and is one of the most effective commercially available appliances.

The patent specification US 2003071735 A1 describes a wildlife protection system (wildlife warning system) that can be activated by means of a radio signal, or that transmits an activation signal to adjacent wildlife warning systems upon activation by means of a sensor.

However, the electronic wildlife warning devices known to date are also associated with problems.

Appliances that involve the detection of the headlamp light from approaching vehicles have a relatively short early warning time for the wild animals, for example, when the vehicles are approaching at relatively high speed. Vehicle speeds of just approximately 50 km/h and above often do not leave the wild animals enough time to be able to leave the road before the vehicle arrives, however.

Furthermore, such appliances are ineffective in daylight, since the signal generators are triggered when a headlamp light is detected, which means that the appliances are usually activated by an ambient light sensor only at twilight or at the onset of night.

In the case of wildlife warning devices that, regardless of the amount of vehicles, are activated when the wild animals themselves are detected, there is also the risk of familiarization effects, since the triggering of the light and sound signals is then not associated with a specific danger situation. Therefore, the effectiveness of such installations can be impaired over the longer term.

Electronic wildlife warning appliances are generally also at risk of theft and complex to maintain on account of the limited life of the components. Therefore, frequent time-consuming and costly inspections are required in order to ensure continuous operation and availability of the wildlife warning devices.

The present invention is therefore based on the technical problem of providing a wildlife warning system that solves or at least minimizes the problems described above for known wildlife warning devices.

SUMMARY OF THE INVENTION

The subject of the present invention is therefore a wildlife warning system that comprises at least two independent warning devices, wherein each warning device has an electric power supply, at least one signal generator and a microcontroller for controlling the signal generator, wherein the wildlife warning system according to the invention is characterized in that each warning device furthermore comprises a communication means for wireless communication with other warning devices and/or with a base station for the purpose of forming a wireless network of wildlife warning devices.

The wireless network, provided according to the invention, of wildlife warning devices that communicate with one another and/or with a base station covers an area to be protected on a road, a railway track section or a runway at an airport. The number of independent wildlife warning devices connected in the wireless network is in this case dependent on the size of the area to be protected and the range of the signal generators.

The wildlife warning system according to the invention has numerous associated advantages: for example, communication by the wildlife warning devices allows them to interchange information about oncoming vehicles with one another. If a vehicle entering a monitored road section is detected, for example, it is possible not just to trigger the signal generator of the first warning device but also, by virtue of the information being transmitted to subsequent warning devices by means of the communication means, to trigger the signal generators of said subsequent warning devices, as a result of which the early warning time is increased accordingly and wild animals have sufficient time to leave the road or the track bed even when fast vehicles are approaching.

In addition, the reliability of the network of wildlife warning devices can be increased. By way of example, the warning devices can use their built-in communication means to transmit not only information about oncoming vehicles but also status information. If a warning device registers a malfunction in a neighboring warning device, for example, it can increase the amplitude of its single generator, for example, in order to compensate at least to some extent for the scaring effect of the faulty warning device on wild animals. In addition, network-relevant information of this kind can easily be read wirelessly from a single warning device during maintenance work, for example in order to be able to identify single faulty warning devices more quickly in a relatively large network. Alternatively, network-relevant information of this kind can be transmitted to a base station in a network that transmits such information by wire or wirelessly to a very remote control center, from where appropriate maintenance work can be prompted.

Furthermore, the warning devices that are wirelessly networked to one another may be configured to co-ordinate the triggering of warning effects among one another. By way of example, the signal generators of the warning devices may be configured for synchronous triggering or for triggering in waves along the monitored section. The warning effects can also be varied, for example in order to prevent a familiarization effect in the wild animals in respect of the audible or visual signals.

Finally, the networked network of warning devices is also suitable for configuring the individual warning devices of the network centrally or providing them with software updates. If a base station is part of the network, the relevant data can be transmitted from a remote service control center to the individual warning devices of the network via the base station. However, it is also possible for a single warning device to be appropriately configured in situ during maintenance work, with the data subsequently being transmitted via the communication means of the warning device to the other warning devices in the network.

In line with a preferred embodiment of the wildlife warning system according to the invention, the wireless network comprises at least one detection device for sensing approaching vehicles. Such a detection device is preferably arranged at the boundary of the area to be monitored, for example a road section. By way of example, the detection device may comprise an inherently known light sensor that reacts to the headlamps of an approaching vehicle. In order to allow monitoring throughout the day, however, this is preferably a sensor that can detect vehicles regardless of the time of day, that is to say particularly regardless of headlamps being switched on. By way of example, capacitive or inductive sensors that are inset in a road or arranged on a road can be used for vehicle detection. In addition, optical sensors, for example light barriers, ultrasonic detectors, acoustic detectors or radar appliances can be used. Preferably, the vehicle speed is also evaluated in order to optimize the triggering of the signal generators of the individual warning devices. Alternatively, the detection device used may be a receiver that receives a signal actively transmitted by the approaching vehicle and activates the warning devices in the network accordingly. Such a system is found to be particularly useful for safeguarding runways at unnamed small airports. An approaching aircraft scheduled for loading can then trigger the warning devices fitted along the runway itself by means of a radio signal and in this way can drive away any wild animals that may be in the landing area in good time. Such information actively transmitted by approaching vehicles may also comprise what are known as ETSI G5 CAM messages, for example, which transmit position and vector information (that is to say position, direction of travel and speed) for the vehicle on 5.9 gigahertz. Such information can be received by the detection device immediately upon entry into the monitored area or else can be transmitted from the vehicle or by means of the interposition of traffic control centers to the base station of a network, so that information about approaching vehicles may be available even before said vehicles are sensed by a detection device.

The detection device may be an independent component and in this case is likewise equipped with communication means for integration into the wireless network. Preferably, however, at least one of the warning devices in the network is provided with the detection device. Particularly preferably, all the warning devices in the network are of identical design and each have a detection device. This ensures a maximum degree of redundancy, so that it is immediately possible to compensate for the failure of single warning devices. Furthermore, subsequent warning devices can be dynamically matched to any changes in the vehicle speed or to the vehicle stopping/turning.

The communication means of warning devices or of the base station with the warning devices can use any suitable wireless transmission medium. By way of example, the warning devices can communicate with one another by means of infrared signals. To this end, the warning devices have appropriate infrared transmitters and receivers. However, types of transmission that do not require any visual link between individual warning devices and work even under adverse environmental conditions such as snow, rain or fog are particularly preferred. Particularly preferably, the communication means of the warning devices therefore use radio data transmission.

Preferably, protocol-based radio communication is used that, particularly preferably, comprises interchange of network-relevant information, such as events (identified vehicles, malfunctions in the sensor network, attempted theft) and status information from the individual wildlife warning systems. The vehicle identification in each wildlife warning system and the forwarding of the information within the network allow additional information such as direction and speed of the vehicles to be ascertained. Hence, the trigger sequence can be tuned to every single vehicle and hence the warning effect can be improved. The communication protocol used may be 6LoWPAN (IPv6 over Low Wireless Personal Area Network), for example.

Preferably, each subscriber in the network, that is to say particularly the warning devices but also any independent detection devices that may be provided for sensing vehicles, has explicit network addresses, for example IPv6 addresses for identification. This allows configuration data, for example, to be specifically addressed within the wireless network or else the failure of individual components to be registered. In addition, arbitrarily complicated patterns of signal generator triggering can be generated on the basis of the respective danger situations.

Particularly preferably, the wireless network comprises a base station (Server/Gateway) for linking the network to a more remote service control center. The base station therefore has firstly communication means for wireless communication with the warning devices in the wireless network and communication means for communication with the service control center. In this case, the communication with the service control center can take place by wire using lines laid in the ground or overland lines or wirelessly, for example via mobile radio networks or satellite radio networks. The base station (Server/Gateway) is used particularly for requesting service information from the individual warning devices, particularly about operating state, brightness, temperature, amount of vehicles and the like, and for receiving warning information, for example about the low battery state of individual warning devices, about the failure of individual warning devices or the removal thereof from the network. Secondly, the base station can receive from the service control center vehicle information, for example the aforementioned ETSI G5 CAM messages, that is relevant to the network of the respective base station. Finally, the integration of a base station into the network allows remote configuration or remote software updating of the individual In line with a preferred embodiment of the wildlife warning system according to the invention, the warning devices are equipped with a position sensor, for example a biaxial or triaxial acceleration sensor. By way of example, the position sensor can emit a warning notice when the warning device is no longer correctly oriented, for example after a vehicle collision, which means that the operability of the visual and audible signal generators may be impaired. In addition, the position sensor also serves as a theft prevention system, so that in the event of dislocation of the warning device a radio report can be triggered and/or the visual or audible signal generators can be activated. In addition, the explicit identifier of the warning devices serves as a theft prevention system, so that, in conjunction with the opportunity for wireless polling in driving past, it is also possible to identify warning devices reported as stolen that are being reused at another location.

In the event of dislocation, the position sensor for theft prevention can generate a radio report and/or activate visual and/or audible actuators. Furthermore, a functional unit can be provided that recognizes whether the wildlife warning system is moving in order to be able to distinguish a theft from an inadvertent bump. In addition, an audible and/or visual alarm system may be provided that is triggered when a theft attempt is identified. Preferably, a wireless polling opportunity is also provided in order to identify wildlife warning systems reported stolen when driving past. According to one embodiment, a functional unit for identifying the direction and speed at which a wildlife warning system is removed from its position is provided. By virtue of the wildlife warning device that has been removed from its position communicating with other wildlife warning devices that are still situated in their position at the edge of the road, it is possible to determine both the current position and the direction and speed of the wildlife warning device that has been removed from its position.

As additional theft prevention, the warning device may be connected to a foldout ground anchor by means of a mounting device (for example a wire cable, a rod, etc.). By way of example, the ground anchor may be arranged in folded-in form in a mounting device, for example a rod or a traffic post, and can be folded out into the ground by pulling the wire cable or by rotating the rod after the mounting device has been introduced.

The power supply for the warning device of the wildlife warning system according to the invention may comprise batteries or storage batteries, particularly a lithium polymer storage battery. Particularly preferably, the warning device furthermore comprises a solar module for charging the storage battery. This may be thin layer solar cells, for example, that are specifically optimized for low incidence of light, so that charging is ensured even under poor light conditions, for example in forest sections. Typically, use with combined visual and audible warning signals on a road with an average amount of traffic achieves operating times of approximately two months without the need for a relatively long charging phase. Just a single sunny day then recharges the storage battery for an operating phase of over one month.

However, the solar module of the warning device can be used not just for charging the storage battery but also as a communication interface with the microprocessor. Appropriate light signals that are output to the solar module can be used by the maintenance personnel to switch on and off or else configure the warning device. This allows the implementation of an inexpensive interface for switching on and off and configuring the wildlife warning systems that has almost no power consumption of its own.

BRIEF DESCRIPTION OF THE DRAWINGS

The wildlife warning system according to the invention is explained in more detail below with reference to accompanying drawings, in which.

DETAILED DESCRIPTION OF THE INVENTION

Figure 1:
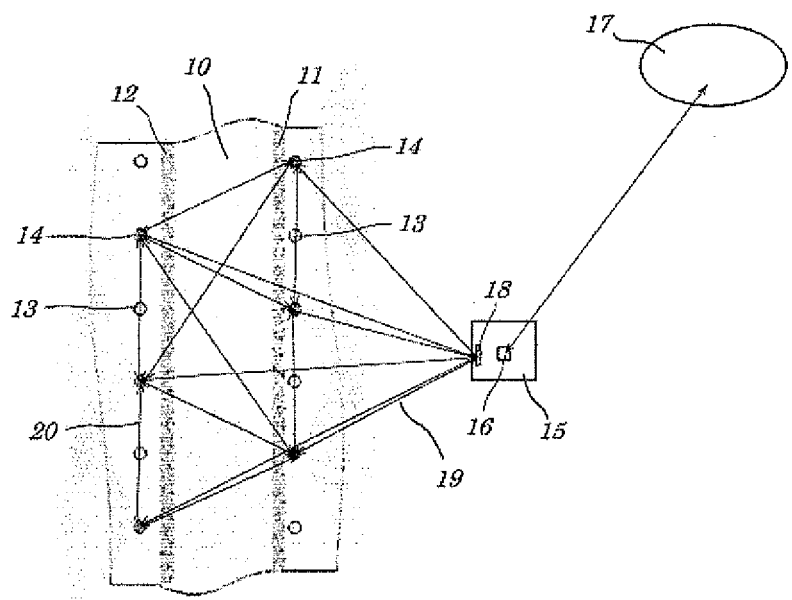
FIG. 1 shows a schematic illustration of a road section monitored by a plurality of warning devices.

FIG. 1 shows a section of a road 10 that is being monitored with the wildlife warning system according to the invention. Mounted at the edges 11, 12 of the road 10 are traffic posts 13, usually at intervals of 25 meters. Every 25 meters, the traffic posts are equipped with warning devices of the wildlife warning system according to the invention alternately on the left-hand and right-hand sides of the road. In the case of road sections with a lower level of risk, the devices can also be fitted every 50 meters, for example. The warning devices 14 can communicate with one another and/or with a base station 15 situated nearby wirelessly. By way of example, the base station 15 is equipped with a GSM or UMTS module 16 that it can use to communicate with a remote service control center 17. For wireless communication with the warning devices 14 in the network, the base station 15 has a radio module 18 that can be used to communicate over relatively short distances of between a few hundred meters and a few kilometers. The network may also be configured such that a short range for the communication module 18 prompts communication only with a warning device 14 that is situated in direct proximity to the base station 15, and the warning devices 14 that likewise have communication means for wireless communication with other warning devices forward appropriate data to the destination warning device, which means that it is also possible for relatively long road sections having relatively low-power and therefore energy-saving radio communication means to be monitored. The radio communication between base station 15 and warning devices 14 is symbolized by the arrows 19 in FIG. 1. The radio communication of the warning devices 14 among one another is symbolized by arrows 20.

Figure 2:
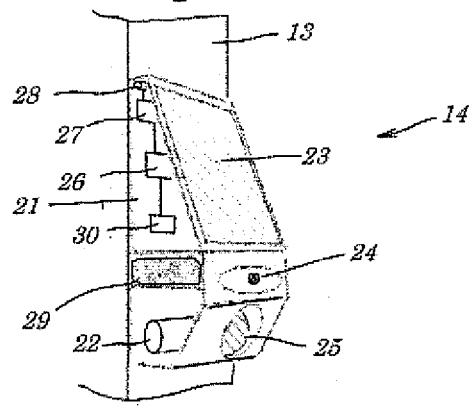
FIG. 2 shows a schematic illustration of a single warning device.

FIG. 2 shows a warning device 14 of the wildlife warning system according to the invention that can be mounted on a road traffic post 13, for example. The warning device 14 has a weatherproof housing 21 that contains the power supply 22, for example a lithium polymer storage battery, which is indicated only symbolically and is powered by a solar module 23, a light-emitting diode 24 that serves as a visual signal generator, a loudspeaker 25 that serves as a visual signal generator and a microcontroller 26 for controlling the two signal generators. Furthermore, the microcontroller 26 can ensure charge protection for the power supply 22. Furthermore, the housing 21 contains communication means 27 that comprise an antenna 28 for communicating with other warning devices or with the base station 15. Furthermore, the warning device 14 has a headlamp sensor 29 for detecting approaching vehicles, The communication means 27 are likewise controlled by the microcontroller 26. Finally, the housing 21 contains a position sensor 30, the signals from which are likewise evaluated by the microcontroller 26, so that in the event of an accident, for example, when the warning device 14 is no longer in its proper position or in the event of theft of the warning installation, an appropriate alarm can be triggered and transmitted to the service control center 17 via the communication means 27 and the base station 15.

Figure 3:
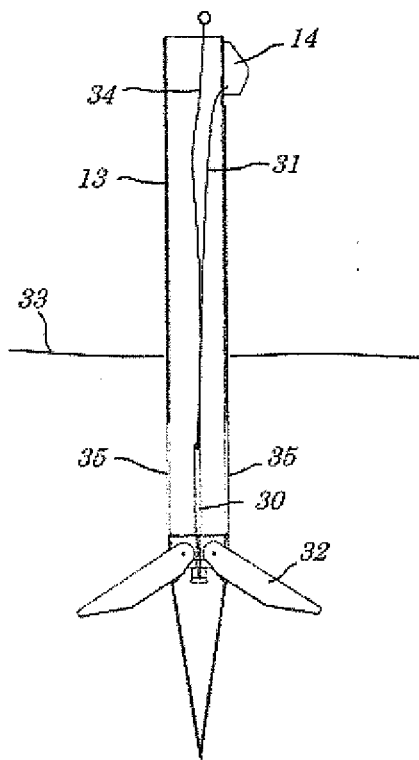
FIG. 3 shows an example of a warning device of the wildlife warning system according to the invention, which warning device is secured with a ground anchor.

Conventional traffic posts can easily be ripped out of the ground, which means that a traffic post with a warning device can also easily be stolen. To improve theft prevention, the traffic post 13 or else a separate mounting rod on which the warning device 14 may be mounted can therefore be provided with a mechanical theft prevention system. A preferred embodiment of such a theft prevention system is shown in FIG. 3, wherein the traffic post 13 is provided with a ground anchor 30 that is connected to the warning device 14 by means of a wire cable 31. The ground anchor 30 has two or more foldout arms 32 that, after the post 13 has been inserted into the ground 33, can be folded out through openings 34 provided in the outer wall of the post 13 by means of the securing wire 30 or a separate pull cable 34, so that the post with the warning device can be securely anchored in the ground.

Figure 4:
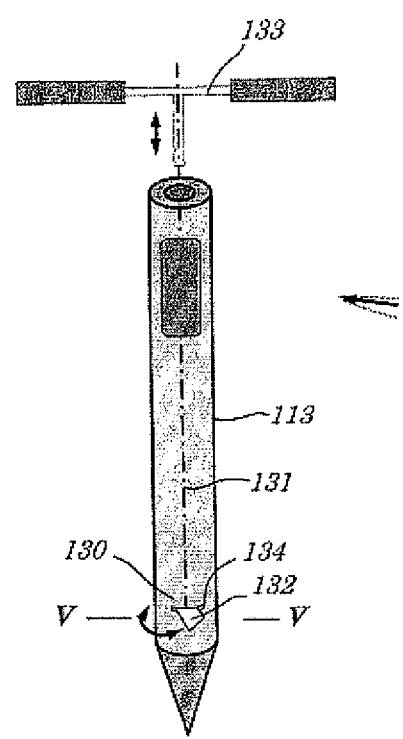
FIG. 4 shows a variant of the warning device in FIG. 3.
Figure 5:
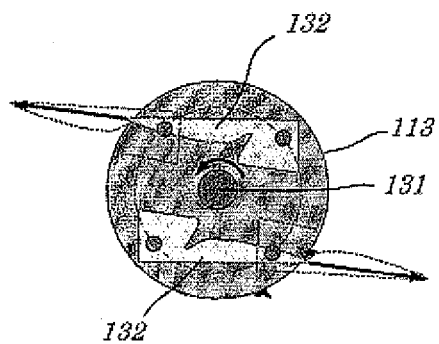
FIG. 5 shows a schematic cross section through the wildlife warning device of FIG. 4 along the line V-V in FIG. 4.

FIG. 4 shows a variant of the warning device in FIG. 3. In this case, the traffic post 113 again has a ground anchor 130, which in the example shown can be operated by means of a rod 131. By rotating the rod 131, one or more (two in the example shown) arms 132 are folded out. After the post 113 has been inserted into the ground, the rod 131 is rotated by means of a twist grip that can be inserted into the post 113, so that the arms can be folded out through openings 134 provided in the outer wall of the post 113 (cf. FIG. 5, which shows a schematic cross section through the wildlife warning device along the line V-V in FIG. 4).

Having described the invention, the following is claimed:

1. A wildlife warning system comprising:
   at least two independent warning devices, wherein each warning device has:
   an electric power supply,
   a detection device for sensing approaching vehicles,
   at least one signal generator for emitting audible and/or visual signals,
   a microcontroller for controlling the at least one signal generator, and
   a communication means for wireless communication with other warning devices and/or with a base station for the purpose of forming a wireless network of wildlife warning devices,
   wherein each warning device has an associated explicit network identification.

2. The wildlife warning system as claimed in claim 1, wherein the wireless network is a radio network.

3. The wildlife warning system as claimed in claim 1, wherein the wireless network comprises a base station for linking the network to a server control center.

4. The wildlife warning system as claimed in claim 3, wherein the base station uses a telephone or mobile radio network to communicate with the service control center.

5. The wildlife warning system as claimed in claim 1, wherein the warning device comprises a position sensor.

6. The wildlife warning system as claimed in claim 1, wherein the warning device comprises a mechanical theft prevention system.

7. The wildlife warning system as claimed in claim 6, wherein the mechanical theft prevention system comprises a foldout ground anchor.

8. The wildlife warning system as claimed in claim 1, wherein the electric power supply of the warning device comprises a storage battery.

9. The wildlife warning system as claimed in claim 8, wherein the warning device comprises a solar module for charging the storage battery.

10. The wildlife warning system as claimed in claim 9, wherein the warning device can be configured using the solar module.

11. The wildlife warning system as claimed in claim 8, wherein the storage battery is a lithium polymer storage battery.

12. The wildlife warning system as claimed in claim 1, wherein the electric power supply of the warning device comprises a battery.

13. The wildlife warning system as claimed in claim 1, wherein the at least one signal generator is a visual signal generator that includes a light emitting diode.

14. The wildlife warning system as claimed in claim 1, wherein the at least one signal generator is an audible signal generator that includes a loudspeaker.

* * * * *